US009631553B2

(12) United States Patent
Jin et al.

(10) Patent No.: US 9,631,553 B2
(45) Date of Patent: Apr. 25, 2017

(54) PROCESS AND EQUIPMENT FOR COAL GASIFICATION, AND POWER GENERATION SYSTEM AND POWER GENERATION PROCESS THEREOF

(71) Applicants: Hongguang Jin, Beijing (CN); Xiaosong Zhang, Beijing (CN)

(72) Inventors: Hongguang Jin, Beijing (CN); Xiaosong Zhang, Beijing (CN)

(73) Assignee: Institute of Engineering Thermophysics, Chinese Academy of Sciences, Beijing (CN)

( * ) Notice: Subject to any disclaimer, the term of this patent is extended or adjusted under 35 U.S.C. 154(b) by 52 days.

(21) Appl. No.: 14/373,181

(22) PCT Filed: May 22, 2013

(86) PCT No.: PCT/CN2013/076048
§ 371 (c)(1),
(2) Date: Jul. 18, 2014

(87) PCT Pub. No.: WO2014/101370
PCT Pub. Date: Jul. 3, 2014

(65) Prior Publication Data
US 2015/0292404 A1    Oct. 15, 2015

(30) Foreign Application Priority Data

Dec. 29, 2012 (CN) .......................... 2012 1 0590808
Dec. 29, 2012 (CN) .......................... 2012 1 0592802
(Continued)

(51) Int. Cl.
*F02C 3/22* (2006.01)
*C10J 3/00* (2006.01)
(Continued)

(52) U.S. Cl.
CPC ................ *F02C 3/22* (2013.01); *C01B 3/12* (2013.01); *C01B 3/50* (2013.01); *C01B 31/18* (2013.01);
(Continued)

(58) Field of Classification Search
CPC ....... C01B 3/50; C01B 3/12; C01B 2203/047; C01B 2203/0475; C10K 3/04;
(Continued)

(56) References Cited

U.S. PATENT DOCUMENTS 2,624,696 A * 1/1953 Schutte .................. C10B 55/06
201/34
3,904,386 A * 9/1975 Graboski .............. C07C 1/0485
423/656
(Continued)

FOREIGN PATENT DOCUMENTS

CN        1386829      12/2002
CN      101100607       1/2008
(Continued)

OTHER PUBLICATIONS

International Search Report for related International Patent Application No. PCT/CN2013/076048, mailed Oct. 10, 2013.

*Primary Examiner* — Carlos A Rivera
(74) *Attorney, Agent, or Firm* — McDermott Will & Emery LLP

(57) ABSTRACT

A coal gasification process is provided based on the grading conversion of carbon hydrogen components of coal, wherein the coal gasification process comprises a carbonization process, a carbon monoxide-producing process and a shift reaction process. By blending the coke-oven gas, carbon monoxide and hydrogen produced in the above processes in different ratios, coal gasification syngases with various carbon hydrogen ratios can be obtained. Further, the coal
(Continued)

gasification process does not need pure oxygen to take part in the reactions, and has several advantages, such as high gasification efficiency, low equipment investment costs, less limitation on the types of coal and flexible adjustment of the gasification products.

10 Claims, 3 Drawing Sheets

(30) Foreign Application Priority Data

Dec. 29, 2012 (CN) .................. 2012 2 0748379 U
Dec. 29, 2012 (CN) .................. 2012 2 0748788 U

(51) Int. Cl.
| | | |
|---|---|---|
| C01B 31/18 | (2006.01) | |
| C10J 3/62 | (2006.01) | |
| C10J 3/10 | (2006.01) | |
| C10J 3/60 | (2006.01) | |
| C10J 3/82 | (2006.01) | |
| C10K 3/04 | (2006.01) | |
| C10K 3/06 | (2006.01) | |
| F23L 15/04 | (2006.01) | |
| C01B 3/50 | (2006.01) | |
| C01B 3/12 | (2006.01) | |

(52) U.S. Cl.
CPC .  *C10J 3/00* (2013.01); *C10J 3/10* (2013.01); *C10J 3/60* (2013.01); *C10J 3/62* (2013.01); *C10J 3/82* (2013.01); *C10K 3/04* (2013.01); *C10K 3/06* (2013.01); *F23L 15/04* (2013.01); *C01B 2203/04* (2013.01); *C01B 2203/0475* (2013.01); *C10J 2300/093* (2013.01); *C10J 2300/0943* (2013.01); *C10J 2300/0969* (2013.01); *C10J 2300/1246* (2013.01); *C10J 2300/1653* (2013.01); *C10J 2300/1675* (2013.01); *C10J 2300/1815* (2013.01); *Y02E 20/16* (2013.01); *Y02E 20/18* (2013.01); *Y02P 20/129* (2015.11)

(58) Field of Classification Search
CPC   F23L 15/04; Y02E 20/16; Y02E 20/18; C10J 2300/0969; C10J 2300/093; C10J 2300/0943

See application file for complete search history.

(56) References Cited

U.S. PATENT DOCUMENTS

| | | | | |
|---|---|---|---|---|
| 4,121,912 | A * | 10/1978 | Barber | C10J 3/485 252/373 |
| 4,422,858 | A * | 12/1983 | Weber | C10J 3/02 252/373 |
| 4,524,581 | A * | 6/1985 | Cascone | F01K 23/067 518/723 |
| 4,704,137 | A * | 11/1987 | Richter | C10J 3/06 252/373 |
| 4,936,869 | A * | 6/1990 | Minderman | C01B 3/48 423/655 |
| 5,937,652 | A | 8/1999 | Abdelmalek | |
| 7,334,390 | B2 * | 2/2008 | Firey | F02C 3/28 60/39.12 |
| 2007/0256361 | A1 * | 11/2007 | Kindig | C01B 3/105 48/197 R |
| 2009/0239960 | A1 * | 9/2009 | Wallace | C10G 2/32 518/700 |
| 2010/0129691 | A1 * | 5/2010 | Dooher | C01B 3/34 429/425 |
| 2012/0066967 | A1 * | 3/2012 | Rinker | C10B 49/02 44/591 |
| 2015/0141536 | A1 * | 5/2015 | Zhang | C10K 1/004 518/702 |

FOREIGN PATENT DOCUMENTS

| | | |
|---|---|---|
| CN | 101781583 | 7/2010 |
| CN | 101942345 | 1/2011 |
| CN | 103045308 | 4/2013 |
| CN | 103060012 | 4/2013 |

* cited by examiner (b)

PROCESS AND EQUIPMENT FOR COAL GASIFICATION, AND POWER GENERATION SYSTEM AND POWER GENERATION PROCESS THEREOF

CROSS-REFERENCE TO RELATED APPLICATIONS

This application is a National Phase application filed under 35 USC 371 of International Application No. PCT/CN2013/076048, filed on May 22, 2013, which claims the benefit and priority from Chinese Patent Application No. 201210590808.0, filed on Dec. 29, 2012, Chinese Patent Application No. 201210592802.7, filed Dec. 29, 2012, Chinese Patent Application No. 201220748379.0, filed Dec. 29, 2012 and Chinese Patent Application No. 201220748788.0, filed Dec. 29, 2012, the disclosures of which are incorporated herein by reference in their entirety.

FEDERALLY SPONSORED RESEARCH OR DEVELOPMENT

Not Applicable.

TECHNICAL FIELD

The present application belongs to the fields of energy sources and power and the chemical industry of coal. In particular, the present application relates to a process for coal gasification by the grading conversion of carbon hydrogen components of coal and the equipment thereof, as well as to a power generation system and a power generation process based thereon.

BACKGROUND OF THE INVENTION

Nowadays and in the coming several decades, coal will be the main source of energy in China. However, coal has properties different from those of gaseous fuels; coal contains a great amount of harmful substances such as ash and the like, while the gaseous fuels are clean energy sources. Just because the differences between coal and gaseous fuels in term of the quality as well as the energy conversion and utilization mode, the power generation efficiency of a coal-fired power plant is 10%-15% lower than that of a natural gas combined cycle power plant. Currently, in order to achieve an efficient and clean utilization of coal, coal must be gasified in advance so as to provide necessary conditions for the efficient utilization of coal, whether in a production process in the chemical industry of coal or in the integrated gasification combined cycle (IGCC) power generation system.

The gasification process of coal is a technical process, in which coal or coal coke is used as a raw material; oxygen (air, oxygen-rich gas or industrial pure oxygen), carbon dioxide, water vapor or the like is used as a gasification agent (or referred to as a gasification medium); the combustible portion of the coal or coke oven gas is transformed into a combustible gas by chemical reactions in a high temperature condition. The composition of the syngas or coal gas obtained by coal gasification depends on the type of the fuels and the gasification agent, as well as the conditions for performing the gasification process. There are variety of coal gasification processes. Four kinds of gasifiers used widely are the Lurgi furnace, Winkler furnace, Texaco furnace and Shell furnace. The cold coal gas efficiency thereof is about 65%-80%.

An air separation unit is needed due to the need for pure oxygen to react with coal in the coal gasification process. The resultant syngas only can be used after cleaning and removing dusts, and a waste heat boiler is also necessary to recover the waste heat, which renders the coal gasification efficiency low and the cost of investment very high.

Meanwhile, different coal gasification processes have different requirements depending on the types of coal. In China, the mineable coal is about one trillion tons, being divided into lignite, bituminous coal and anthracite. Lurgi gasifier can utilize lignite and a part of bituminous coal (long-flame coal, non-caking coal, weakly caking coal and gas coal); the available amount of resources is 593.45 billion tons and accounts for 58% of the total amount of resources. Texaco gasifier can utilize most of bituminous coal; the available amount of resources is 672.88 billion tons and accounts for 66% of the total amount of resources. Shell gasifier can utilize lignite and almost all of bituminous coal; the available amount of resources is 924.2 billion tons and accounts for 91% of the total amount of resources. Winkler gasifier can utilize lignite and a small part of bituminous coal (long-flame coal and non-caking coal); the available amount of resources is 447.96 billion tons and accounts for 44% of the total amount of resources.

In China, the highly efficient and clean utilization of coal is a difficult problem to be solved urgently. Currently, technique used to achieve this objective in the electric power industry is to use the integrated gasification combined cycle (IGCC) power generation system. The IGCC system first gasifies the coal to create necessary conditions for further utilization of coal, and then generates power by using the syngas obtained from the coal gasification.

However, unlike the coal-fired power plant, the IGCC system has strict requirements on the types of coal, which depends on the mode of coal gasification adopted by the IGCC system. The IGCC system has problems such as low gasification efficiency and high equipment costs. The low gasification efficiency is mainly due to the need for adding pure oxygen during the coal gasification. The energy consumption of the air separation device for producing oxygen is high, meanwhile the equipment investments are also increased. The high equipment costs are mainly due to the current relatively high equipment cost of the gasification unit. Because more ash and sulfur are contained in the gasified syngas, dust removal and desulfuration units are needed, which makes the equipment investments to be further increased. Currently, the cost of IGCC is about 1500$/kW, in which the air separation device accounts for about 10-20%, the gasification device accounts for about 30%, the waste heat boiler accounts for about 10-15%, the combined cycle power generation unit accounts for about 30%, and the syngas cleaning unit accounts for about 10%.

Additionally, the main types of coal for the traditional coking technique are coking coal and fat coal in the bituminous coal, which account for only about 9% of the total resources.

To sum up, in the gasification process of coal and in the promotion of application of IGCC power generation system, there are still obstacles such as low gasification efficiency, high costs of equipment investment, and limitation in types of coal. Therefore, either for the chemical industry or for the power generation industry, how to improve the efficiencies in coal gasification and power generation, how to reduce the costs of coal gasification and power generation, and how to improve the adaptability of the power generation system of coal gasification to the types of coal, are all huge challenges to be solved urgently.

SUMMARY OF THE INVENTION

Aiming at the above disadvantages and shortages, an object of the present disclosure is to provide a coal gasification process by grading conversion of carbon hydrogen components of coal and the equipment thereof, as well as the power generation system and the power generation process based thereon.

Therefore, in one aspect, one embodiment provides a coal gasification process by grading conversion of carbon hydrogen components of coal, characterized in that the coal is divided into a gasifying coal and a heat-supplying coal, and the coal gasification process includes a carbonization process, a monoxide-producing process and a shift reaction process, wherein the carbonization process carbonizes the gasifying coal to produce a product comprising crude coke, coke-oven gas and tar; the carbon monoxide-producing process subjects the crude coke produced in the carbonization process to react with carbon dioxide to produce carbon monoxide, and the heat needed is also supplied by the heat from the combustion of heat-supplying coal and high-temperature air; the shift reaction process subjects a part of carbon monoxide produced in the carbon monoxide-producing process to react with water vapor to produce carbon dioxide and hydrogen, and carbon dioxide and pure hydrogen are obtained by separating with a separation device; the coke-oven gas, carbon monoxide and hydrogen produced in the above processes are blended in different ratios, so that coal gasification syngases having different hydrocarbon ratios can be obtained.

In a preferred embodiment, the gasifying coal is bituminous coal or lignite, and the heat-supplying coal is any type of coal.

In a preferred embodiment, the reaction temperature of the carbonization process is 600~900° C., and the temperature at which the conversion reaction occurs in the shift reaction process is 200~400° C.

In a preferred embodiment, no pure oxygen is involved in the reactions of the coal gasification process.

In a preferred embodiment, the heat needed for the carbonization process and the carbon monoxide-producing process is supplied by the heat from the combustion of the heat-supplying coal and high-temperature air.

In a preferred embodiment, the carbon dioxide separated from the shift reaction process is returned to the carbon monoxide-producing process for further reacting with the crude coke, and all of the carbon dioxide used in the carbon monoxide-producing process is supplied by the carbon dioxide produced in the shift reaction process.

In another aspect, the an equipment for performing the above gasification process comprises an external combustion unit, heat transfer units, a carbonization unit, a carbon monoxide-producing unit, a shift reaction unit and a waste heat recovery unit, wherein the carbonization process is performed in the carbonization unit, the carbon monoxide-producing process is performed in the carbon monoxide-producing unit, the shift reaction process is performed in the shift reaction unit, and the heat-supplying coal and the high-temperature air are combusted in the external combustion unit, which supplies heat to the carbonization unit and the carbon monoxide-producing unit respectively via the heat transfer units, and releases waste heat to the waste heat recovery unit.

In a preferred embodiment, the carbonization unit is a heating furnace, a soaking furnace or a calcining furnace used in metallurgic industry.

In a preferred embodiment, the waste heat recovery unit is a regenerative waste heat recovery unit and/or a recuperative waste heat recovery unit.

In a preferred embodiment, the heat-supplying coal and the high temperature air preheated through the waste heat recovery unit are combusted in the external combustion unit, and the resultant high-temperature flue gas is delivered into the heat transfer unit after a crude dust removal, and releases heat to the carbonization unit and the carbon monoxide-producing unit respectively through the partition wall of the heat transfer units, and then is delivered to the waste heat recovery unit.

In a preferred embodiment, the crude coke produced in the carbonization process is entered the carbon monoxide-producing unit from the top thereof, while carbon dioxide is entered the carbon monoxide-producing unit from the bottom thereof, and they both are reacted after meeting, and the crude coke is gasified into carbon monoxide, and the resultant carbon monoxide is discharged from the top of the carbon monoxide-producing unit.

In another aspect, a power generation process is provided based on the grading conversion of carbon hydrogen components of coal, characterized in that the coal gasification syngas obtained by the above gasification process or equipment is introduced into a power generation unit of a conventional integrated gasification combined cycle power generation system, so that the chemical energy of the coal gasification syngas is converted into electric power and thus generates power.

In another aspect, a power generation system is provided based on the grading conversion of carbon hydrogen components of coal, characterized in that the power generation system comprises an external combustion unit, heat transfer units, a heat exchange unit, a carbonization unit, a carbon monoxide unit, a shift reaction unit, a carbon dioxide-separating unit and a power generation unit, the coal is divided into gasifying coal and heat-supplying coal, wherein the heat-supplying coal and the high-temperature air are combusted in the external combustion unit and produce high-temperature flue gas, which supplies heat to the carbonization unit and the carbon monoxide-producing unit via the heat transfer units; the heat exchange unit is used to recover the waste heat of the high-temperature flue gas which is used to preheat air to produce the high-temperature air; the carbonization unit is used to convert the gasifying coal into crude coke, and at the same time, to produce a coke-oven gas and a by-product containing tar; the carbon monoxide-producing unit is used to gasify the crude coke produced by the carbonization unit into carbon monoxide, and the reaction occurred therein is that the crude coke is reacted with carbon dioxide to produce carbon monoxide; the shift reaction unit is used to convert the carbon monoxide produced by the carbon monoxide-producing unit into a shifted gas of carbon dioxide and hydrogen; the carbon dioxide-separating unit is used to obtain pure carbon dioxide from the mixed gas by separation, and transport the obtained carbon dioxide to the carbon monoxide-producing unit for reaction; the power generation unit is used to convert the chemical energy of the coal gasification syngas which is consisted of the coke-oven gas, carbon monoxide and hydrogen produced above into electric energy.

In a preferred embodiment, the power generation unit generates electric energy in a conventional combined cycle process for power generation.

In a preferred embodiment, the carbonization unit is a heating furnace, a soaking furnace or a calcining furnace used in metallurgic industry.

In a preferred embodiment, the carbonization unit obtains pure crude coke by removing the ash and sulfur-containing ingredient of the coal in the form of a tar-containing by-product, so that the crude coke is reacted with carbon dioxide to produce pure carbon monoxide which is entered the shift reaction unit directly.

In another aspect, provides a power generation process is provided by using the above power generation system, wherein the system generates electric power by converting the chemical energy of the coal gasification syngas into electric energy.

The gasification process by the grading conversion of carbon hydrogen components of coal in one embodiment is based on the principle of "component assortment and grading conversion" for the fuel. In the gasification process of one embodiment, the gasification of coal is divided into three processes, i.e. the carbonization process, the carbon monoxide-producing process and the shift reaction process. Firstly, the coal is carbonized for purification to produce crude coke. Then the crude coke is reacted with carbon dioxide to produce carbon monoxide. At last, hydrogen and carbon dioxide are produced by a shift reaction, wherein the carbon dioxide is supplied to the unit in which the coke is changed into carbon monoxide. Syngas having various carbon hydrogen ratios can be obtained by mixing the hydrogen, the carbon monoxide and the coke-oven gas. The heat needed by the coal carbonization process and the carbon monoxide-producing process is provided by combustion of coal. In the traditional gasification process, all reactions are carried out simultaneously during the gasification process. On the contrary, in the novel gasification process of one embodiment, three reactions are assorted and carried out in the carbonization process, the carbon monoxide-producing process and the conversion hydrogen-producing process, respectively. Furthermore, the gasification process does not require pure oxygen to participate in the reactions, and thus has several advantages, such as high gasification efficiency, low cost of equipment investment, unlimited types of coal, and flexible adjustment of gasification products. Additionally, the power generation process and system based on the grading conversion of carbon hydrogen components of coal overcomes the drawbacks in the current IGCC power generation system, such as high equipment investment, the need for a separate air separation device for supplying oxygen, and relatively high limitations for the types of coal.

BRIEF DESCRIPTION OF THE DRAWINGS

To understand the present invention, it will now be described by way of example, with reference to the accompanying drawings in which.

DETAILED DESCRIPTION

Figure 1A:
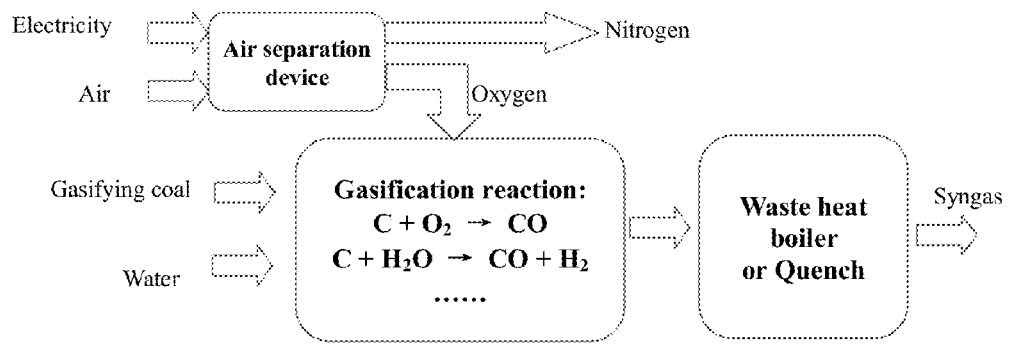
FIG. 1 is a schematic showing the comparison of the principles between the process by the grading conversion of carbon hydrogen components of coal (b) according to the present disclosure and that of the traditional gasification process of coal (a).

The coal gasification process by the grading conversion of carbon hydrogen components of coal according to the present disclosure is based on the following principle: "component assortment and grading conversion" for the fuel. The gasification of coal is divided into three processes, i.e., the carbonization process, the carbon monoxide-producing process and the shift reaction process.

First, the carbonization process is performed. This process carbonizes and optionally purifies the gasifying coal, wherein the heat needed is provided by the heat from the combustion of the heat-supplying coal and high-temperature air, and chemical industrial products such as crude coke, coke-oven gas and tar are produced.

Next, the carbon monoxide-producing process is performed. The crude coke produced in the carbonization process is reacted with carbon dioxide to produce carbon monoxide, wherein the heat needed is also provided by the above heat from the combustion of the heat-supplying coal and high-temperature air.

Then, the shift reaction process is performed. A part of carbon monoxide produced in the above carbon monoxide-producing process and water vapor are subjected to a shift reaction, so as to produce carbon dioxide and hydrogen. Separation is performed to produce carbon dioxide and pure hydrogen by using a separation device. Part of carbon dioxide is separated and returned to the carbon monoxide-producing process for further reacting with coke. All of the carbon dioxide needed in the carbon monoxide-producing process is supplied by the carbon dioxide produced in the shift reaction process.

Coke-oven gas, carbon monoxide and hydrogen are produced in the three steps of the entire gasification process of coal, respectively. By blending these three gases in arbitrary ratios, coal gasification syngases having different carbon-hydrogen ratios are produced.

The equipments provided in the present disclosure for performing the above processes are mainly composed of an external combustion unit, heat transfer units, a carbonization unit, a carbon monoxide unit, a shift reaction unit, and a waste heat recovery unit. The carbonization process is performed in the carbonization unit. The carbon monoxide-producing process is performed in the carbon monoxide-producing unit. The shift reaction process is performed in the shift reaction unit. The fuel is divided into a heat-supplying coal and a gasifying coal. The heat-supplying coal is combusted with the high-temperature air in the combustion unit. The resultant high-temperature flue gas provides heat to the carbonization unit and carbon monoxide-producing unit through heat transfer units respectively, and further releases the waste heat to the waste heat recovery unit. The gasifying coal is fed into the carbonization unit for coking to produce rough crude coke. Then, the crude coke is reacted with carbon dioxide to produce carbon monoxide. If necessary, a part of the carbon monoxide is converted to carbon dioxide and hydrogen through the shift reaction with water vapor. Then pure hydrogen is separated by a separation device. The rest of the carbon dioxide is returned to the carbon monoxide-producing unit and is further reacted with coke.

In the gasification method, the coal is gasified via the carbonization process, the carbon monoxide process of the coke and the shift reaction process constitute the coal gasification, and thus a novel gasification method of coal by "component assortment and grading conversion" is achieved.

In the gasification method, a rough coking process with external combustion of coal is used in the carbonization unit of the coal, and the fuel used is divided into a gasifying coal and a heat-supplying coal. As the gasifying coal, all bituminous coal and lignite can be used, and as the heat-supplying coal, all types of coal can be used.

In the gasification method, crude coke is reacted with carbon dioxide to produce carbon monoxide, wherein oxygen is unnecessary. Compared with the traditional gasification process of coal, the air separation unit for producing oxygen is omitted.

In the gasification method, the resultant carbon monoxide does not contain particles of impurities such as ash, and can enter the shift unit directly, so that the waste heat boiler is omitted.

In the gasification method, the reaction can be occurred at a temperature ranging from 600 to 900° C. of the carbonization unit. The products after the carbonization are crude coke, coke-oven gas, tar and the like. The shift reaction is occurred at about 200-400° C. Compared with the endothermic gasification reaction at high temperature (about 1000° C.) of the traditional gasification, the irreversibility of the reaction is greatly reduced.

In the gasification method, the coke-oven gas, carbon monoxide and hydrogen are produced by the reactions in three steps, respectively. By blending these three gases in arbitrary ratios, syngases having different carbon hydrogen ratios from gasification of coal can be produced, so that various technical requirements are satisfied.

In the gasification method, the fuel is divided into a gasifying coal and a heat-supplying coal. The gasifying coal is used to produce the syngas, and the heat-supplying coal is used to supply reaction heat needed by the endotherm of the carbonization unit and the gasification unit.

In the gasification method, the carbon dioxide needed by the carbon monoxide-producing unit is obtained from the shift unit.

In the gasification method, the heat-supplying coal is combusted and produces high-temperature flue gas which, after a rough dust removal, supplies heat to the carbonization unit and the gasification unit.

In the gasification method, the carbonization unit can also be a heating furnace, a soaking furnace or a calcining furnace in the metallurgic industry.

Furthermore, in one embodiment, based on the energy saving mechanism of "grading utilization of the Gibbs energy of the fuel", a power generation process based on the grading conversion of carbon hydrogen components of coal is provided. The power generation process uses coal as the fuel, wherein the coal is divided into a gasifying coal and a heat-supplying coal. The coal gasification syngas produced by the grading gasification of the gasifying coal is introduced into the combined cycle power generation unit (IGCC) to generate electric power, characterized in that the grading gasification process of the gasifying coal is divided into three conversion steps, i.e. a carbonization process, a carbon monoxide-producing process and a shift reaction process in this order, and carried out gradually. Throughout the entire process, no pure oxygen is involved in the reactions. The gasifying coal is gradually converted into coke-oven gas, carbon monoxide and hydrogen, which achieves the grading conversion of carbon hydrogen components. After blending these three gases in arbitrary ratios, syngases having different carbon hydrogen ratios from the gasification of coal are produced. The detailed process of the conversion is as described above.

In the power generation process, as the gasifying coal, all bituminous coal and lignite can be used, and as the heat-supplying coal, all types of coal can be used.

In the power generation process, the high-temperature flue gas which is produced by the external combustion of the heat-supplying coal with the high-temperature air, supplies heat to the carbonization process and the carbon monoxide-producing process after a crude dust removal.

In the power generation process based on a grading conversion of carbon hydrogen components of coal, the coal is gradually gasified in three steps, i.e. the carbonization process, carbon monoxide-producing process and the shift reaction process, so as to achieve the "component assortment and grading conversion" of the coal. In the carbonization process, the rough coking of the gasifying coal is performed, so that the impurities such as ash and sulfur in the coal are removed, and pure crude coke is obtained. In the carbon monoxide-producing process, the pure coke is used to react with carbon dioxide, in which oxygen is not needed. The resultant carbon monoxide does not contain particles of impurities such as ash, and can be fed into the shift reaction process directly. A part of the carbon monoxide produced in the carbon monoxide-producing process is converted to hydrogen and carbon dioxide after the shift reaction process, and then the carbon dioxide is separated and supplied to the carbon monoxide-producing process.

In one embodiment, a power generation system based on the grading conversion of carbon hydrogen components of coal is provided. Equipment for this power generation system mainly comprises an external combustion unit, a heat transfer unit, a heat exchange unit, a carbonization unit, a carbon monoxide unit, a shift reaction unit, a carbon dioxide-separating unit and a power generation unit, characterized in that:

the carbonization unit is used to transform the gasifying coal into crude coke with producing the coke-oven gas, and further producing by-product such as tar;

the carbon monoxide-producing unit is used to gasify the crude coke produced by the carbonization unit into carbon monoxide, and the reaction occurred in this unit is the reaction between coke and carbon dioxide to produce carbon monoxide;

the shift reaction unit is used to transform the carbon monoxide produced in the carbon monoxide-producing unit into a mixed gas of carbon dioxide and hydrogen;

the carbon dioxide-separating unit is used to separate pure carbon dioxide from the above mixed gas, and to output the resultant carbon dioxide to the carbon monoxide-producing unit;

the high-temperature flue gas produced from the combustion of the heat-supplying coal and high-temperature air in the external combustion unit transfers heat to the carbonization unit and the carbon monoxide-producing unit through the heat transfer units;

the heat exchange unit is used to recover the waste heat of the flue gas and at the same time pre-heat the air to form the above high-temperature air;

the power generation unit is used to transform the chemical energy of the coal gasification syngas comprised of coke-oven gas, carbon monoxide and hydrogen into electric energy.

Further, the above power generation unit employs a combination cycle manner for power generation, wherein the combination cycle consists of a gas turbine, a steam turbine and a waste heat boiler. The "waste gas" discharged from the gas turbine is introduced into the waste heat boiler to heat water so as to produce steam with high temperature and high pressure, which then drives the steam turbine to work.

Further, the above carbonization unit can be a heating furnace, a soaking furnace or a calcining furnace in the metallurgic industry.

By performing the gasification process of coal in three separate steps, i.e. coal carbonization, coke gasification and shift reaction, the gasification process reduces the irreversibility of the entire gasification reaction, so that the efficiency of the gasification of coal is increased significantly; eliminates the air separation device and the waste heat boiler, so that the equipment investment is reduced; divides the fuel into gasifying coal and heat-supplying coal, so that the adaptability of various types of coal is improved greatly. According to the different characteristics of the coal, the combustion of the coke-oven gas is replaced by the external combustion of the coal to provide heat to the carbonization chamber and the gasification chamber, so that a reasonable utilization of the coal is achieved. Compared with a conventional gasification process, the grading gasification process of coal of the present disclosure achieves the component assortment and grading gasification of coal, and the cold coal gas efficiency of the present disclosure is higher than that of the traditional gasification of coal by about three (3) percentage points.

Additionally, by performing the gasification process of coal in three separate steps, i.e. coal carbonization, coke gasification and shift reaction, the power generation process and the power generation system of the present disclosure achieve the "component assortment and grading conversion" of coal. Compared with the IGCC system in prior art, pure oxygen is not needed, so that the air separation unit for producing oxygen is omitted; the ash and sulfur-containing ingredient in the coal is removed in the form of by-products such as tar during the carbonization process, so that the resultant syngas comprises almost no ash and sulfur-containing ingredient, thus a waste heat boiler, a dust removal installation and a desulfuration unit are not needed. According to the different characteristics of the coal, the combustion of the coke-oven gas is replaced by the external combustion of the coal to provide high temperature heat to the carbonization chamber and the gasification chamber, wherein coals with inferior quality can be used as the heat-supplying coal, so that a reasonable utilization of the energy sources is achieved. Compared with the traditional power generation system by coal gasification (IGCC), the present power generation process by coal gasification achieves the component assortment and grading utilization of coal, and the power generation efficiency of the present invention is higher than that of the IGCC system by about six (6) percentage points.

In order to make the objects, technical solutions and advantages of the present disclosure more clear and apparent, the present disclosure will be further illustrated in detail with reference to the drawings and examples.

In the traditional coal gasification process, oxygen is separated from air by using electricity, and then the separated oxygen is used for the production of syngas, of which the specific process and reactions are shown in FIG. 1($a$).

As shown in FIG. 1($b$), in the gasification process of coal by the grading conversion of carbon hydrogen components of coal according to the present invention, the gasification process of coal is divided into three processes, i.e. the carbonization process, the carbon monoxide-producing process and the shift reaction process. Firstly, the carbonization process is performed, this process carbonizes and purifies the gasifying coal, wherein the heat needed is provided by the heat from the combustion of the heat-supplying coal and high-temperature air, and the chemical industrial products such as crude coke, coke-oven gas and tar are produced. Next, the carbon monoxide-producing process is performed, the crude coke produced in the carbonization process is reacted with carbon dioxide to produce carbon monoxide, wherein the heat needed is also provided by the above heat from the combustion of the heat-supplying coal and high-temperature air. After that, the shift reaction process is performed, a part of carbon monoxide produced in the above carbon monoxide-producing process and water vapor are subjected to a conversion reaction to produce carbon dioxide and hydrogen. Separation is performed to obtain carbon dioxide and pure hydrogen by using a separation device. The carbon dioxide separated is returned to the carbon monoxide-producing process for further reacting with coke. All of carbon dioxide needed in the carbon monoxide-producing process is supplied by the carbon dioxide produced in the shift reaction process. Coke-oven gas, carbon monoxide and hydrogen are produced in the three steps of the entire gasification process of coal, respectively. By blending these three gases in arbitrary ratios, coal gasification syngases having different carbon hydrogen ratios are produced.

Figure 2:
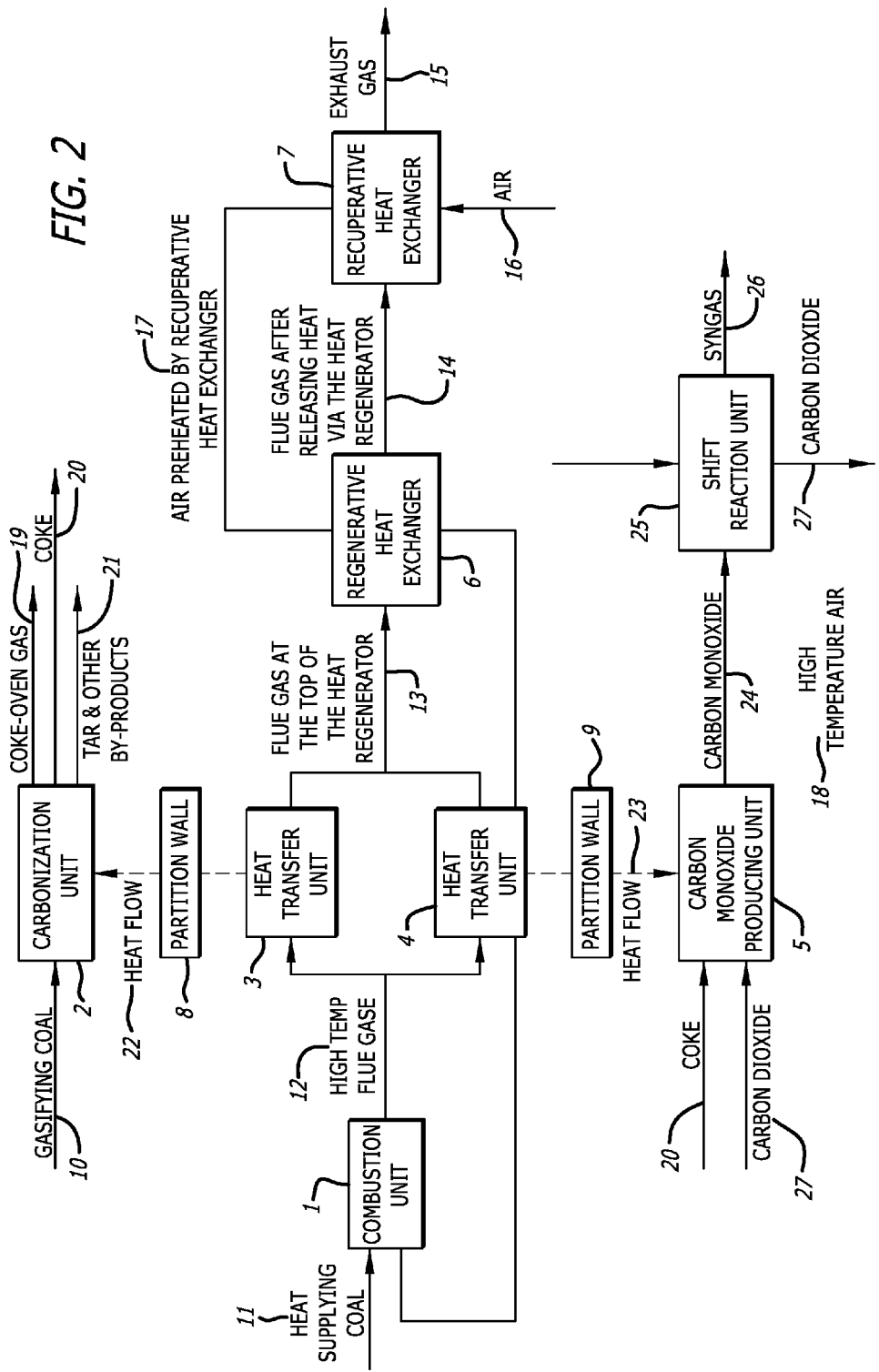
FIG. 2 is a schematic showing the process flow and equipment of the coal gasification process by the grading conversion of carbon hydrogen components of coal according to the present disclosure, wherein the respective component and the corresponding reference number are as follows: 1—combustion unit; 2—carbonization unit; 3, 4—heat transfer unit; 5—carbon monoxide-producing unit; 6—regenerative heat exchanger; 7—recuperative heat exchanger; 8, 9—partition wall; 10—gasifying coal; 11—heat-supplying coal; 12—high-temperature flue gas; 13—flue gas at the top of the heat regenerator; 14—flue gas after releasing heat via the heat regenerator; 15—exhaust gas; 16—air; 17—air preheated by recuperative heat exchanger; 18—high-temperature air; 19—coke-oven gas; 20—coke; 21—tar and other by-products; 22, 23—heat flow; 24—carbon monoxide; 25—shift reaction unit; 26—syngas; 27—carbon dioxide.

FIG. 2 is a schematic showing the process flow and equipments of the gasification process of coal by the grading conversion of carbon hydrogen components of coal of the present invention. As illustrated in FIG. 2, firstly, the gasifying coal is fed into the carbonization unit and undergoes rough coking to produce crude coke, and the crude coke is further reacted with carbon dioxide to produce carbon monoxide. According to the requirements, a part of the carbon monoxide is converted to carbon dioxide and hydrogen through a conversion reaction with water vapor, and pure hydrogen is separated by using a separation device. The rest of the carbon dioxide is returned to the carbon monoxide-generating unit and is further reacted with coke.

The equipment utilizing this process is mainly composed of the combustion unit 1, the heat transfer units 3 and 4, the carbonization unit 2, the carbon monoxide-producing unit 5, the shift reaction unit 25, the regenerative waste heat recovery unit 6 and the recuperative waste heat recovery unit 7. In the present disclosure, the carbonization process is performed in the carbonization unit 2; the carbon monoxide-producing process is performed in the carbon monoxide-producing unit 5; the shift reaction process is performed in the shift reaction unit 25; the heat-supplying coal 11 and the high-temperature air 18 pre-heated by the regenerative waste heat recovery unit 6 and the recuperative waste heat recovery unit 7 are combusted in the combustion unit 1 to produce the high-temperature flue gas 12; and after a rough dust removal, the high-temperature flue gas 12 is fed into the heat transfer units 3 and 4; the high-temperature flue gas releases high temperature heat to the carbonization unit 2 and the carbon monoxide-producing unit 5 via the partition walls 8 and 9 respectively, and then is delivered to the waste heat recovery units 6 and 7 and releases heat to the regenerative waste heat recovery unit 6 and the recuperative waste heat recovery unit 7. After releasing heat, the flue gas, i.e. the exhaust gas 15, is discharged to the atmosphere. In the carbonization unit 2, the gasifying coal 10 absorbs the heat 22 and decomposes at high temperature. After a caking process (including the drying and desorption, beginning to decompose, forming plastic mass, and solidification of the plastic mass) and a semi-coke contraction process, the chemical industrial products such as the coke 20, the coke-oven gas 19 and the tar 21 are produced. The resultant coke 20 is entered the carbon monoxide-producing unit 5. In this unit, the coke 20 is reacted with carbon dioxide 27 to produce carbon monoxide 24. The carbon monoxide 24 is entered the shift reaction unit 25 and is reacted with water vapor to produce hydrogen 26, meanwhile carbon dioxide 27 produced is supplied to the carbon monoxide-producing unit 5. The coke 20 obtained in the carbonization unit 2 (about 1000° C.) is entered the carbon monoxide-producing unit 5 from the top thereof, while carbon dioxide 27 is entered the unit 5 from the bottom thereof. They both are reacted after meeting, and the coke 20 is gasified into carbon monoxide 24. The carbon monoxide 24 is discharged from the top of the unit 5. This gasification reaction is an endothermic reaction, wherein the heat needed is provided by the high-temperature flue gas 12 produced in the combustion unit 1.

The difference between the gasification process of one embodiment of the present disclosure (see FIG. 2) and the traditional gasification process is that, in the traditional gasification process, the coal is reacted and gasified directly in the gasification chamber, while the gasification process of coal is gradually performed in the gasification manner, i.e. it is divided into the carbonization of coal, the conversion of coke into carbon monoxide and the conversion reaction. Firstly, the coal is entered the carbonization chamber to be carbonized and purified, meanwhile the coke-oven gas is produced. The purified coke is entered the carbon monoxide-producing unit and is reacted with carbon dioxide to produce carbon monoxide. The carbon monoxide is reacted with water vapor in the conversion unit to produce hydrogen and carbon dioxide.

The difference between the conversion of coke into carbon monoxide provided by the present disclosure and the traditional gasification process is that, the coke is reacted with carbon dioxide to produce carbon monoxide without needing the air separation device.

Figure 1B:
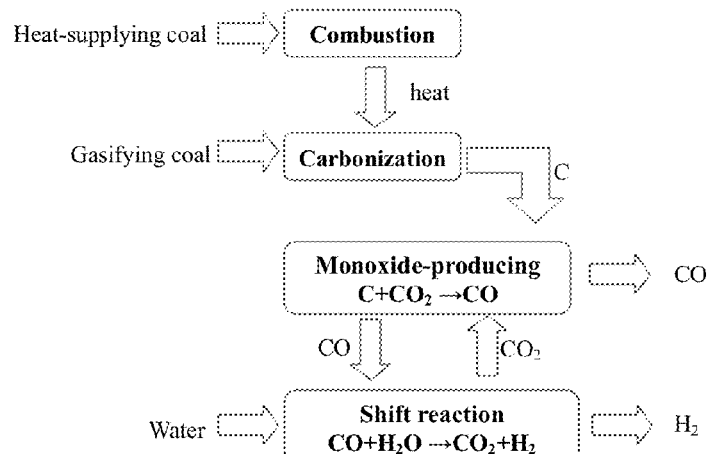

Referring to FIGS. 1(a) and 1(b) again, the differences between the shift reaction unit provided by the present disclosure and the conversion unit in the traditional gasification process of coal are as follows. The conversion reaction occurred in the traditional gasification process is occurred in the gasification furnace together with other gasification reactions of coal at a reaction temperature over 1000° C. Before the conversion reaction, the water vapor needs to absorb a large amount of heat in order to reach the reaction temperature. At the same time, other gases such as hydrogen, carbon monoxide or the like would decrease the reaction rate of the conversion process. However, the conversion reaction of the present invention is occurred in the conversion unit alone, and the reaction temperature is about 200-400° C. The heat needed to be absorbed by the water vapor is reduced greatly, meanwhile the reaction process is not interfered by other gases. Therefore, the irreversible loss during the total reaction is much lower than that in the traditional gasification process.

From the viewpoint of the products of the coal gasification, the differences between the gasification unit provided by the present disclosure and the traditional gasification unit of coal are as follows. The traditional gasification unit of coal needs pure oxygen and water vapor to gasify the coal, and the resultant syngas is typically a mixed gas of carbon monoxide, hydrogen and carbon dioxide. However, there are typically three kinds of gases in the syngas produced in the present invention, i.e., coke-oven gas, carbon monoxide and hydrogen. These three gases can be blended in arbitrary ratios, thus various demands for the carbon hydrogen ratio in the downstream utilization can be satisfied.

The differences between the carbonization process in the gasification process provided by the present disclosure and the traditional coking process are as follows. The traditional coking process has a more strict demand on the types of the coal, wherein coking coal and fat coal are primarily used. The products of the coking process in the present disclosure are useful in gasification, which has a lower demand on the types of the coal, so that all types of bituminous coal and lignite can be used. The usable coal account for 90% of the types of coal reserves in China, which enlarges the applicability to the type of coal.

Figure 3:
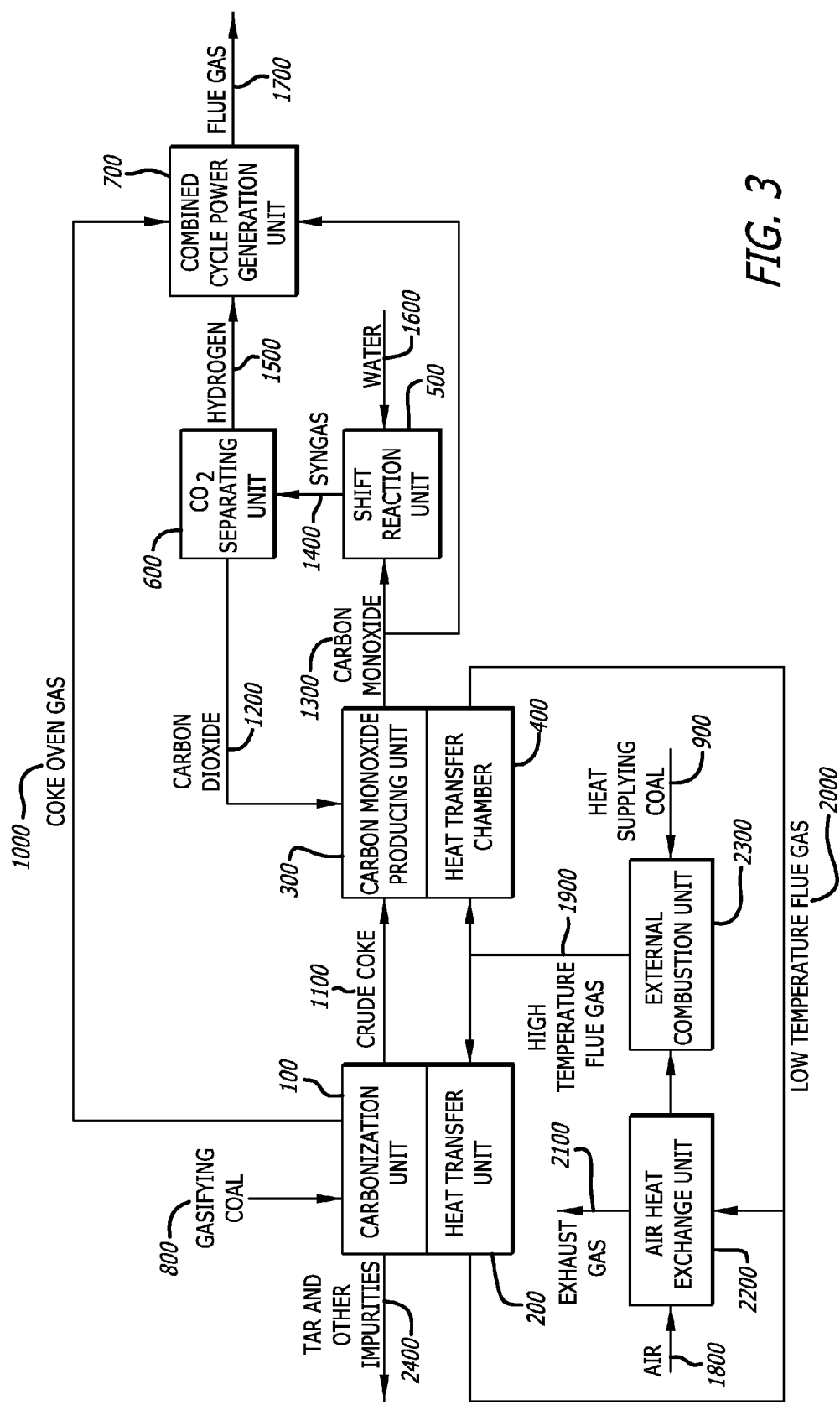
FIG. 3 is a schematic showing a power generation system based on the grading conversion of carbon hydrogen components of coal according to the present disclosure, wherein the respective component and the corresponding reference number are: 100—carbonization unit; 200—heat transfer unit; 300—carbon monoxide-producing unit; 400—heat transfer chamber; 500—shift reaction unit; 600—$CO_2$-separating unit; 700—combined cycle power generation unit; 800—gasifying coal; 900—heat-supplying coal; 1000—coke-oven gas; 1100—crude coke; 1200—carbon dioxide; 1300—carbon monoxide; 1400—syngas; 1500—hydrogen; 1600—water; 1700—flue gas; 1800—air; 1900—high-temperature flue gas; 2000—low-temperature flue gas; 2100—exhaust gas; 2200—air heat-exchange unit; 2300—external combustion unit; 2400—tar and other impurities.

Referring to FIG. 3, the power generation system based on the grading gasification of carbon hydrogen components of coal provided by the present disclosure is shown. The system mainly comprises a carbonization unit 100, a carbon monoxide-producing unit 300, a shift reaction unit 500, a carbon dioxide-separating unit 600, a combined cycle power generation unit 700 and an external combustion unit 2300, wherein the heat exchange units 200 and 400 are contained in both the carbonization unit and the carbon monoxide-producing unit. The heat-supplying coal and the high-temperature air pre-heated by the air heat exchange unit 2200 are combusted in the external combustion unit 2300 to produce a high-temperature flue gas 1900. After a rough dust removal, the high-temperature flue gas 1900 releases high temperature heat to the carbonization unit 200 and the carbon monoxide-producing unit 500 via the heat exchange units 200 and 400, and then is delivered to the air heat exchange unit 2200 for releasing heat. After having the heat released, the flue gas 2100 is discharged into the atmosphere. In the carbonization unit 100, the gasifying coal absorbs heat to be pyrolyzed at high temperature. After a caking process (including the drying and desorption, beginning to decompose, forming plastic mass, and solidification of the plastic mass) and a semi-coke contraction process, the chemical industrial products such as the crude coke 1100, the coke-oven gas 1000 and the tar 2400 are produced. The resultant crude coke 1100 is entered the carbon monoxide-producing unit, and in this unit, the coke is reacted with carbon dioxide 1200 to produce carbon monoxide 1300. The carbon monoxide 1300 is entered the shift reaction unit 500 and is reacted with water 1600 to produce carbon dioxide and hydrogen, and then is entered the carbon dioxide-separating unit 600. In the carbon dioxide-separating unit 600, the carbon dioxide 1200 is separated and then is entered the carbon monoxide-producing unit 300. The remaining hydrogen-rich syngas 1500 together with the coke-oven gas 1000 and a part of the carbon monoxide 1300 are entered the combined cycle power generation unit 700, in which the chemical energy is converted into electric energy. The resultant flue gas is discharged into the atmosphere.

The power generation process based on the grading conversion of carbon hydrogen components of coal uses coal as the fuel. The coal is divided into a gasifying coal 800 and a heat-supplying coal 900. The grading gasification process of the gasifying coal 800 is performed sequentially in three separate conversion steps, i.e. the carbonization process (being performed in the carbonization unit 100), the carbon monoxide-producing process (being performed in the carbon monoxide-producing unit 300) and the shift reaction process (being performed in the shift reaction unit 500). In the entire process, no oxygen gas takes part in the reaction. The gasifying coal 800 is transformed gradually to coke-oven gas 1000, carbon monoxide 1300 and hydrogen 1500, so that the grading conversion of hydrogen components is achieved. After blending these three gases in arbitrary ratios, syngases with various carbon hydrogen ratios from coal gasification are obtained. The syngas is introduced into the combined cycle power generation unit 700 for power generation.

The differences between the gasification process of coal in the power generation system provided by the present disclosure and the gasification process in the IGCC are as follows: (1) in the traditional gasification process, the coal is reacted and is gasified directly in the gasification chamber, while the gasification process of coal is gradually performed in three steps in the gasification manner of the present disclosure, i.e., the carbonization of coal, the conversion of coke into carbon monoxide, and the shift reaction. Firstly, the coal is entered the carbonization chamber to be carbonized and purified, and the coke-oven gas is produced, meanwhile the crude coke obtained is entered the carbon monoxide-producing unit and is reacted with carbon dioxide, and then is gasified. Therefore, the limitation for needing an air separation device to produce oxygen in the traditional manner of the coal gasification is eliminated; (2) the difference between the conversion of coke into carbon monoxide in the power generation process of the present disclosure and the traditional gasification process is that, the coke is reacted with carbon dioxide to produce carbon monoxide, which is an oxygen-free oxidation, wherein the air separation device is not needed; (3) the differences between the shift reaction unit of the present disclosure and the conversion unit in the traditional gasification process of coal are as follows: the gasification reaction in the traditional gasification process is occurred in the gasification furnace together with other gasification reactions of coal at a reaction temperature over 1000° C. However, the conversion reaction in the present disclosure is occurred in the conversion unit alone, and the reaction temperature is about 200-400° C., and the reaction temperature decreases significantly. Therefore, the irreversible loss during the conversion reaction is much lower than that in the traditional gasification process; (4) the differences between the fuel used in the power generation system of the present disclosure and the fuel used in the IGCC are as follows: the coal used is divided into a gasifying coal and a heat-supplying coal. The heat-supplying coal is combusted in an external combustion chamber and supplies heat for the carbonization of the gasifying coal and the carbon monoxide-producing process. The gasifying coal is directly gasified with the indirect gasification of the heat-supplying coal. The usable types of coal for the gasifying coal and the heat-supplying coal include all types of coal in the coal resource. Thus the applicability of the power generation system by the coal gasification is greatly improved; (5) from the viewpoint of the products of coal gasification, the differences between the carbon monoxide-producing unit provided by the present disclosure and the traditional gasification unit of coal are as follows. The traditional gasification unit of coal needs pure oxygen and water vapor to gasify the coal, and the resultant syngases are typically carbon monoxide, hydrogen and carbon dioxide. However, the carbon monoxide-producing unit of the present disclosure performs gasification by reacting carbon dioxide with coke. The component of the resultant syngas is carbon monoxide with a high concentration up to 95% or more; (6) the differences between the syngas produced by the coal gasification process of the present invention and the syngas produced by the traditional gasification of coal are as follows: in the traditional gasification process of coal, the ash and sulfur-containing ingredient in the coal are gasified at the same time and are present in the syngas from the gasification. A waste heat boiler must be used firstly to decrease the temperature, and a dust-removing equipment and a desulfuration equipment are used to purify the syngas. In the gasification process of the present disclosure, the ash and the sulfur-containing ingredient are removed in the coking unit firstly. After the syngas is produced, a dust-removing unit and a desulfuration unit are not necessary. The syngas can be directly entered the power generation unit, and thus the waste heat boiler, the dust-removing device and the desulfuration device are omitted.

Compared with the traditional integrated gasification combined cycle (IGCC), the power generation process based on the grading gasification of the carbon hydrogen components of coal provided by the present disclosure has the following characteristics: 1) the gasification process of coal is step-by-step performed, namely the coking and purification are performed firstly, and the resultant coke is reacted with carbon dioxide and is gasified directly, so the air separation device in the IGCC system is omitted, and the energy consumption of the system is reduced; 2) the fuel is divided into a heat-supplying coal and a gasifying coal, the heat-supplying coal is combusted in the combustion chamber to supply heat to the carbonization chamber and the gasification chamber, in which the coal with low quality can be used, the indirect gasification of the coal with low quality is achieved, thus the applicability of the fuel is improved; 3) the ash and the sulfur-containing ingredient in the coal are separated in the form of by-products such as tar, so the resultant syngas is very pure, and the waste heat boiler, the dust-removing device and the desulfuration device are not needed; 4) a part of the carbon monoxide produced in the carbon monoxide-producing unit is converted to carbon dioxide during the conversion process, and such carbon dioxide is returned to the carbon monoxide-producing unit and reacted with the crude coke.

To sum up, in the power generation system based on the grading gasification of the carbon hydrogen components of coal of the present disclosure, by means of reducing the air separation unit, together with the dust-removing unit and desulfuration unit, the power generation efficiency of coal gasification is improved, and the production cost is greatly decreased, and the applicability of the types of coal is greatly increased, so the coal with high quality is saved, such system has a powerful practical prospect.

The high performance of the novel coal gasification is mainly caused by the less exergy destruction of the grading conversion of coal instead of the traditional coal gasification, which means the less irreversibility of the novel gasification process.

Next, one embodiment will be further illustrated with reference to the drawings and Examples.

EXAMPLE 1

In accordance with the process flow of the grading gasification of the carbon hydrogen components of coal with the heat supplied by external combustion shown in FIG. 2, the operational conditions of the combustion unit 1 are as follows: the inner pressure of the furnace is set to be a slightly positive pressure, the temperature at which the flue gas exits the furnace is from 1400 to 1700° C., which is appropriately adjusted according to the heat exchange cycle. In the new system, the temperature for discharging smoke is 165° C., and with reference to the actual stream parameters of the coke oven (as shown in Table 3), in the carbonization unit, the heat consumption for the production of one ton of coke is 3240 MJ/t. Provided that the temperature of the carbon monoxide-producing unit is 900° C., and the conversion ratio of carbon is 0.95, the heat exchange loss in each of the carbonization process and the carbon monoxide-producing process is 5%.

Table 1 shows the heat balance table of the coal carbonization unit. In the coal carbonization unit in the novel gasification process, when a product having the same heat value is produced, the fuel input can be reduced by about 5%. Compared with the traditional coking process, the product produced in the carbonization unit of the novel gasification process is crude coke, meanwhile the heat-supplying coal is used instead of the coke-oven gas.

Table 2 shows the energy balance table of the Example systems. From the viewpoint of the fuel input, in the fuels of the novel gasification process, the gasifying coal accounts for about 66% and the heat-supplying coal accounts for about 34%. From the viewpoint of the energy loss, the maximal energy loss is occurred in the $CO_2$-separating unit and accounts for 3.9% of the energy input from the fuel. The energy loss in each of the conversion unit, coking unit and carbon monoxide-producing unit accounts for 2.6%, 2.4% and 2.3% of the energy input from the fuel, respectively. The minimal energy loss is occurred in the heat exchange unit and accounts for 0.5% of the energy input from the fuel.

Table 3 gives the parameters of some main streams in Example 1. The reference numbers of the streams in the table correspond to those in FIG. 2, showing the correlative relationships between each unit of the novel gasification process.

On the basis of the performance comparison shown in Table 4, the cold coal gas efficiency of the novel gasification process can be up to 83%, which is higher than that of the traditional gasification process by about 3%. The exergy efficiency of the novel gasification process is higher than that of the traditional coal gasification process (Shell gasification process) by 6 percentage points, wherein the efficiency of the coal carbonization unit and carbon monoxide-producing unit in the novel gasification process is increased by about 2.5 percentage points over that of the gasification unit in the traditional gasification process, the efficiency of the conversion unit in the novel gasification process is increased by about 1.5% over that of the waste heat boiler in the traditional gasification process, and the efficiency brought by the carbon dioxide of is about 2 percentage points over the air separation unit.

From the comparison with the Shell gasification process shown in Table 4, the reasons for the efficiency improvement of the gasification process mainly attributes to two aspects, one is that the air separation device and the waste heat boiler are omitted, so that the exergy loss brought by these two devices is avoided, the other is that the grading conversion of coal reduces the irreversibility of the gasification reactions, so that the irreversible loss of the reactions is reduced.

Compared with the traditional gasification process of coal, the process based on the grading gasification of the carbon hydrogen components of coal, in which the heat is supplied by external combustion, has the following characteristics: 1) coke is reacted with carbon dioxide and then is gasified to produce carbon monoxide, thus the air separation unit needed for the production of oxygen is omitted; 2) the temperature of the shift reaction is about 200 to 400° C., thus the irreversible loss of the reactions is reduced; 3) the resultant carbon monoxide substantially contains no impurities and can be introduced to the conversion unit directly, thus the waste heat boiler is omitted; 4) the fuel is divided into heat-supplying coal and gasifying coal, meanwhile lignite and bituminous coal can be used as the gasifying coal, and for the heat-supplying coal, the types of coal are not limited. Therefore, in the entire gasification process, all types of heat-supplying coal can be used.

EXAMPLE 2

In accordance with the flow chart of the power generation system based on the grading gasification process of the carbon hydrogen components of coal shown in FIG. 3, the operational conditions of the combustion unit are as follows: the inner pressure of the furnace is set to be a slightly positive pressure, the temperature at which the flue gas exits the furnace is from 1400 to 1700° C. and is appropriately adjusted according to the heat exchange cycle. With reference to the actual test data of the coke oven (Table 1), in the carbonization unit, the heat consumption for the production of one ton of coke is 3240 MJ/t. Provided that the temperature for the production of carbon monoxide is 900° C., and the conversion of carbon is 0.95. The heat exchange loss in each of the coal carbonization process and the carbon monoxide producing process is 5%. An analog computation for the power generation system based on the novel coal gasification process and the IGCC system is performed by using the ASPEN Plus software. The simulation conditions are as follows: the power generation unit uses the combined cycle, the initial temperature of the combustion turbine is 1250° C., the steam system uses a dual pressure reheat procedure, the steam pressure parameters are 9.98/2.5/0.28 MPa, and the steam temperatures are 538/538/260° C., etc. At the same time, a part of steam is taken from the steam cycle to supply heat required for the $CO_2$-separating unit. About 50% of $CO_2$ separated by the $CO_2$-separating unit is supplied to the carbon monoxide-producing chamber. The gasification furnace of the IGCC system uses a Shell gasification furnace, and the $CO_2$-separating unit uses the Selexol separation process. The parameters in the combined cycle part are same with those in the novel gasification power generation system. Based on the simulation parameters in Table 5, the power generation efficiency of the power generation system based on the novel coal gasification process can be up to 47.1% (Table 2), which is higher than that of the integrated gasification combined cycle (IGCC, Shell gasification process) by about 6 percentage points.

TABLE 1

The heat balance of the coal carbonization units of in Example 1 and 2

| | | Process/system of the prior art | | Process/system of the present disclosure | |
|---|---|---|---|---|---|
| | Items | Energy ($10^9$ kcal) | Ratios (%) | Energy ($10^9$ kcal) | Ratios (%) |
| Input | Energy of coke-oven gas as fuel | 1551 (360 MNm$^3$) | 94.5 | 0 | 0 |
| | Energy of coal as fuel | 0 | 0 | 1480 | 94.2 |
| | Energy of coal gas leaked | 90.9 | 5.5 | 90.9 | 5.8 |
| | Total | 1642 | 100 | 1571 | 100 |
| Output | Sensible heat of products — Coke | 724 | 44.1 | 724 | 46.0 |
| | Sensible heat of products — Coke-oven gas | 228 | 13.9 | 228 | 14.5 |
| | Sensible heat of products — Other products | 345 | 21.0 | 345 | 22.0 |
| | Sensible heat of exhaust gas | 238.9 | 14.6 | 146 | 9.3 |
| | Sensible heat of clinker | 0 | 0 | 21.6 | 1.4 |
| | Heat released from the body of coke oven | 107 | 6.5 | 107 | 6.8 |
| | Total | 1642 | 100 | 1571 | 100 |

TABLE 2

The energy balance of the systems of Examples 1 and 2

| | Energy input MJ | Energy loss MJ | Ratios % |
|---|---|---|---|
| Total input: | | | |
| Heat-supplying coal: | 220 | | 34.1 |
| Gasifying coal: | 425 | | 65.9 |
| energy loss in each unit: | | | |
| Heat-supplying unit | | 16 | 2.4 |
| Coking unit | | 15 | 2.3 |
| Carbon monoxide-producing unit | | 10 | 1.6 |
| Conversion unit | | 17 | 2.6 |
| Heat exchange unit | | 3 | 0.5 |
| CO$_2$-separating unit | | 25 | 3.9 |
| Power generation unit | | 246 | 38.1 |
| Total output: | | | |
| Heat value of syngas | | 539 | 83.6 |
| Sensible heat of syngas | | 11 | 1.7 |
| Electricity | | 304 | 47.1 |

TABLE 3

The parameters of main streams of Example 1

| Stream Nos. | Ingredients | Amounts of substances, mol | Temperatures, °C | Pressures, bar |
|---|---|---|---|---|
| 10 | Gasifying coal | 890 (carbon content) | 25 | 1 |
| 11 | Heat-supplying coal | 500 (carbon content) | 25 | 1 |
| 20 | Nitrogen gas: 12%, Hydrogen: 60%, Methane: 23%, Carbon monoxide: 5% | 360 | 800 | 1.05 |
| 19 | Crude coke | 740 | 800 | 1.05 |
| 24 | Carbon monoxide: 96%, Carbon dioxide: 4% | 1540 | 900 | 1.05 |
| 27 | Carbon dioxide: 96%, Carbon monoxide: 4% | 801 | 120 | 1.05 |
| 26 | Hydrogen: 98% Carbon monoxide: 0.5% Carbon dioxide: 1.5% | 765 | 90 | 1.05 |
| | Water: 100% | 290 | 25 | 1 |
| 15 | Nitrogen: 79% Carbon dioxide: 16% Oxygen: 5% | 3200 | 165 | 1.02 |
| 21 | Tar and the like | | 800 | 1 |

TABLE 4

The performance comparison between the gasification process of the present disclosure and the traditional gasification process

| Unit: MW | The gasification process of the present disclosure | The traditional Shell gasification process |
|---|---|---|
| Heat value of the input coal | 645 | 645 |
| Heat value of the resultant syngas | 539 | 515 |
| Cold coal gas efficiency | 0.83 | 0.80 |
| Exergy value input to system | 657 | 685 |
| Exergy of the syngas | 511 | 490 |
| Exergy efficiency of the system | 0.78 | 0.72 |

TABLE 5

The basic parameters of Example 2

| Items | Values | Units |
|---|---|---|
| High conversion reaction temperature | 335 | °C |
| Low conversion reaction temperature | 200 | °C |

TABLE 5-continued

The basic parameters of Example 2

| Items | Values | Units |
|---|---|---|
| Separation ratio of carbon dioxide | 98 | % |
| Pressure loss of the heat exchanger | 3 | % |
| Efficiency of the air compressor | 0.88 | |
| Efficiency of the combustion turbine | 0.9 | |
| Inlet temperature of the combustion turbine | 1250 | ° C. |
| Pinch point temperature difference of the waste heat boiler | 15 | ° C. |
| Smoke-discharging temperature of the waste heat boiler | 120 | ° C. |

TABLE 6

The performance comparison between the power generation system of the present disclosure and the IGCC system

| | The power generation system of the present disclosure | | The IGCC (Shell) system | |
|---|---|---|---|---|
| | Heat, MJ | Exergy, MJ | Heat, MJ | Exergy, MJ |
| Input: | | | | |
| Coal | 644.8 | 657.7 | 644.8 | 657.7 |
| Intermediate output: | | | | |
| Heat value of the resultant syngas | 533 | 510 | 515 | 490 |
| Cold coal gas efficiency | 0.83 | | 0.81 | |
| Output: | | | | |
| Amount of power generation | 303.8 | | 268.6 | |
| Efficiency of power generation | 0.47 | | 0.41 | |

To sum up, when the gasification process based on the grading conversion of carbon hydrogen components of coal with heat supplied by external combustion of the present disclosure is used, the gasification efficiency is greatly improved, and the air separation device and the waste heat boiler can be omitted, so that the investment costs are reduced greatly. Furthermore, all types of heat-supplying coal can be used, the gasification process of the present application has a very powerful practical prospect.

The above contents are only preferred embodiments of the present disclosure, which are not intended to limit the present disclosure. Any modifications, equivalent replacements, improvements and the like without depart from the spirit and principle of the present disclosure, should be included in the protection scope of the present disclosure.

The invention claimed is:

1. A coal gasification process by a grading conversion of carbon hydrogen components of the coal, comprising the steps of: a carbonization process, a carbon monoxide-producing process and a shift reaction process, wherein the carbonization process carbonizes gasifying coal to produce a product comprising crude coke, coke-oven gas and tar;

the carbon monoxide-producing process subjects the crude coke produced in the carbonization process to react with carbon dioxide to produce carbon monoxide, and any heat needed is also supplied from combustion of heat-supplying coal and high-temperature air;

the shift reaction process subjects a part of carbon monoxide produced in the carbon monoxide-producing process and water vapor to a conversion reaction to produce carbon dioxide and hydrogen, and then separation by using a separation device is performed to obtain carbon dioxide and pure hydrogen;

the coke-oven gas, carbon monoxide and hydrogen produced in the above processes are blended in different ratios;

wherein equipment to perform the above steps comprises an external combustion unit, a heat transfer unit, a carbonization unit, a carbon monoxide-producing unit, a shift reaction unit and a waste heat recovery unit, wherein the carbonization process is performed in the carbonization unit, the carbon monoxide-producing process is performed in the carbon monoxide-producing unit, the shift reaction process is performed in the shift reaction unit, and the heat-supplying coal and the high-temperature air are combusted in the external combustion unit, wherein high-temperature flue gas is produced and supplies heat to the carbonization unit and the carbon monoxide-producing unit respectively via the heat transfer unit and releases waste heat to the waste heat recovery unit; and, wherein the heat-supplying coal and the high temperature air preheated by the waste heat recovery unit are combusted in the external combustion unit, wherein high-temperature flue gas is produced and is delivered into the heat transfer units after a crude dust removal and releases heat to the carbonization unit and the carbon monoxide-producing unit respectively via a partition wall of the heat transfer units, and then is delivered to the waste heat recovery unit.

2. The gasification process according to claim 1, wherein the gasifying coal is bituminous coal or lignite, and the heat-supplying coal is of any type of coal.

3. The gasification process according to claim 1 wherein a reaction temperature of the carbonization process and the carbon monoxide-producing process are 600-900° C., and a temperature at which a conversion reaction in the shift reaction process occurs is 200-400° C.

4. The gasification process according to claim 1, wherein no pure oxygen is involved in any reaction in the coal gasification process.

5. The gasification process according to claim 1, wherein heat needed in the carbonization process and the carbon monoxide-producing process is supplied by heat from combustion of the heat-supplying coal and high-temperature air.

6. The gasification process according to claim 1, wherein the carbon dioxide separated from the shift reaction process is returned to the carbon monoxide-producing process for further reacting with the crude coke, and all of the carbon dioxide used in the carbon monoxide-producing process is supplied by the carbon dioxide produced in the shift reaction process.

7. The gasification process according to claim 1, wherein the carbonization unit is a heating furnace, a soaking furnace or a calcining furnace used in metallurgic industry.

8. The gasification process according to claim 1, wherein the waste heat recovery unit is a regenerative waste heat recovery unit and/or a recuperative waste heat recovery unit.

9. The gasification process according to claim 1, wherein the crude coke produced in the carbonization process enters the carbon monoxide-producing unit from a top thereof, while carbon dioxide entered enters the carbon monoxide-producing unit from a bottom thereof, wherein the crude coke and the carbon dioxide react after meeting, wherein the crude coke is gasified into carbon monoxide, and the carbon monoxide is discharged from the top of the carbon monoxide-producing unit.

10. The gasification process of claim 1, wherein the coal gasification syngas is introduced into a power generation unit of a conventional combined cycle power generation system, so that the chemical energy of the coal gasification syngas is converted into electric power so as to generate power.

* * * * *